United States Patent [19]
Colangelo

[11] 3,825,132
[45] July 23, 1974

[54] TOWING AND LIFTING APPARATUS

[76] Inventor: Michele Colangelo, c/o World Wide Real Estate Investment Center, 908 Salem St., Revere, Mass. 02148

[22] Filed: May 11, 1973

[21] Appl. No.: 359,318

[52] U.S. Cl. .................. 214/86 A, 254/139.1
[51] Int. Cl. ........................... B60p 3/12
[58] Field of Search ......... 214/86 A; 254/139.1; 280/402

[56] References Cited
UNITED STATES PATENTS
2,928,557   3/1960   Cline .................. 214/86 A
2,937,772   5/1960   Sullivan ............... 214/86 A Primary Examiner—Albert J. Makay
Assistant Examiner—Donald W. Underwood
Attorney, Agent, or Firm—Jerry Cohen; Charles Hieken

[57] ABSTRACT

Towing of a disabled passenger car or like tow load by another passenger car at turnpike speeds is facilitated by an apparatus comprising a towable wheeled platform, a vertical shock isolator mounted on the platform and a steering yoke mounted on the vertical isolator. A pivotal lift and a motor drive therefor are mounted on the platform and the lift engages the end of the vehicle to be towed and lifts it up and over the wheel of the towing apparatus and is then locked to the above-described yoke to ready the disabled vehicle for towing. The apparatus is convertible to a yard crane by the addition of a pivotal boom and related components.

10 Claims, 1 Drawing Figure

PATENTED JUL 23 1974　　　3,825,132
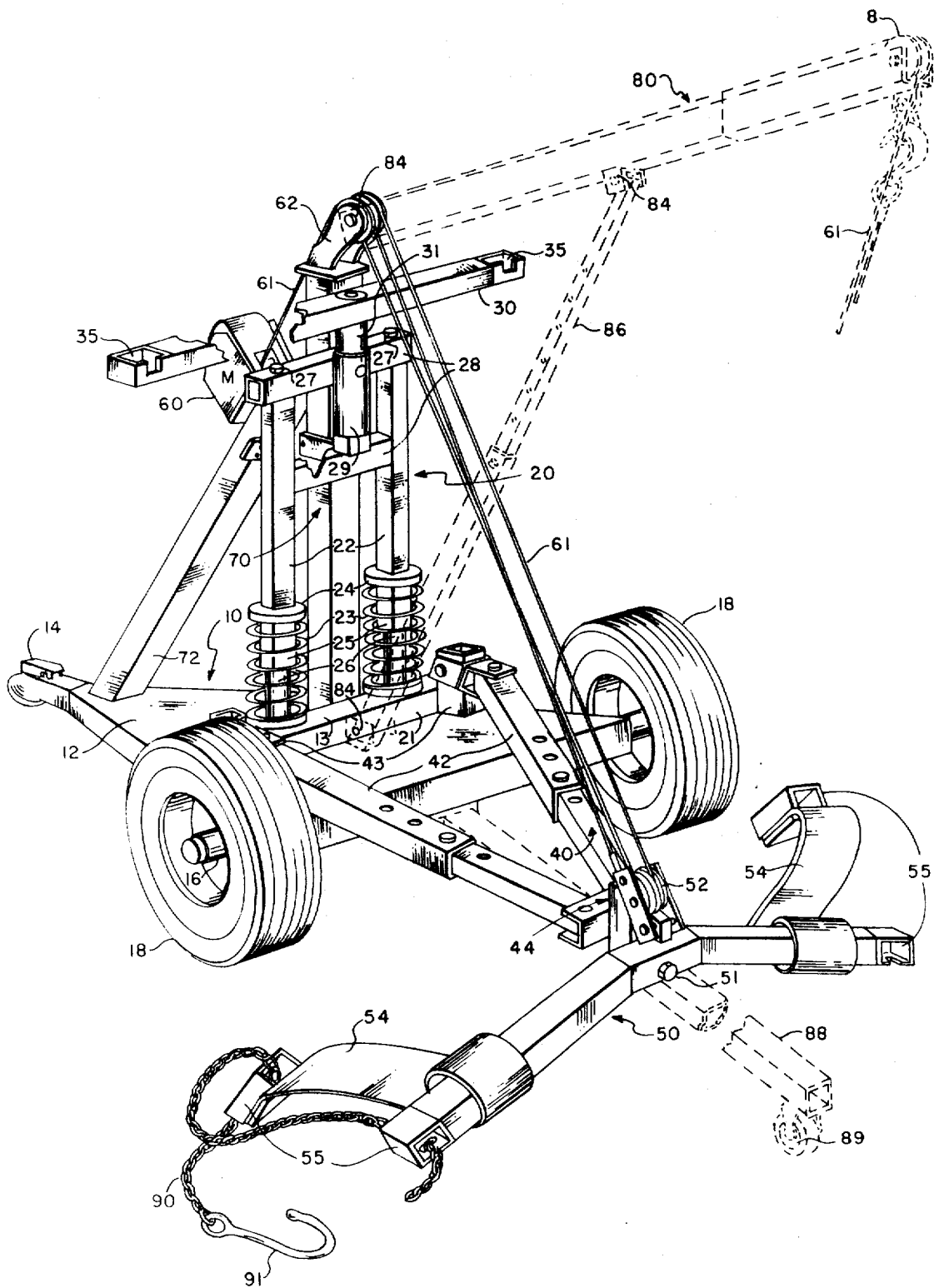

TOWING AND LIFTING APPARATUS

BACKGROUND OF THE INVENTION

The present invention relates to improved towing and lifting apparatus particularly useful in connection with towing one disabled passenger automobile by another.

When an automobile is disabled on the road, there are several methods and apparatus extant for bringing it to a place where it can be serviced. If the disabled automobile is capable of rolling on its four wheels, it can be pushed by another automobile or towed via a cable or chain lashup to a leading automobile with a driver remaining in the disabled automobile to operate the brakes and prevent ramming. In some cases, the chain lashup can be used without a driver in the following automobile; but safe road speeds for the train are limited to below the usual turnpike cruising speeds [such cruising speeds being defined herein as 50–70 mph]. In the more typical case, where a front or rear axle or wheel of the disabled passenger vehicle are not serviceable and it is nevertheless desired to avoid the extreme of bringing a crane capable of lifting the entire automobile and a flatbed trailer, then the state-of-the-art methods of towing involve lifting the disabled end of the automobile and using the other serviceable axle and pair of wheels thereof with the lifted end being coupled to a towing vehicle. The towing vehicle may be a wrecker truck with a crane mounted integrally therein for lifting the disabled vehicle end. Alternatively, a portable towing and lifting apparatus may be hitched onto a passenger car and provide the means for lifting the disabled end of the vehicle to be towed and forming a tow-hitch thereto.

Apparatus of the last named class generally comprise means defining a towable wheeled platform, usually having a single axle with two rubber-tired wheels, a platform mounted thereon and a tow hitch. U.S. Pat. No. 2,937,772 to Sullivan shows such apparatus as further comprising a pivotable lift made of two angled braces pivotable about a horizontal axis just above the two apparatus axle to raise the end of the vehicle to be towed. The lift is interconnected to such vehicle via a yoke which is connected to the lift via a universal joint. The apparatus of Sullivan further comprises a vertical post mounted on the platform and braced by a strut. U.S. Pat. No. 3,145,857 to Hayman et al. shows a towing and lifting apparatus of the same class which is convertible to a crane by lifting the axle and its wheels out of the way to enable a second set of crane wheels to provide the rolling space for the apparatus and performs the vehicle front end lifting functions via an elevated pulley and a cable passed over the pulley from a motor to a mounting yoke for the end of the disabled vehicle to be lifted. A similar elevated pulley for a cable is shown in U.S. Pat. No. 3,127,037 to Newman, U.S. Pat. No. 3,490,627 to Goldston, U.S. Pat. No. 3,401,812 to Wegener et al., and U.S. Pat. No. 1,402,074 to Kloehn.

It is a principal object of the present invention to provide an improved towing and lifting apparatus of the class last described providing safe and effective towing of one disabled passenger vehicle by another at turnpike cruising speeds.

It is a further object of the invention to provide a simple, rugged apparatus consistent with the preceding object.

It is a further object of the invention to provide an economical apparatus consistent with one or both of the preceding objects.

It is a further object of the invention to provide a capability of conversion to a portable crane consistent with one or more of the preceding objects.

It is a further object of the invention to leave all drive portions in an unstressed condition during towing consistent with one or more of the preceding objects.

SUMMARY OF THE INVENTION

According to the present invention, the improved towing and lifting apparatus comprises means defining a towable wheeled platform, a vertical shock isolator mounted on the platform and comprising at least one vertically arranged spring and a vertical loading member mounted on the spring and which [when vertically loaded] comprises the spring vertically, a steering yoke mounted on the vertical loading member and pivotable about a vertical axis thereon, a platform-mounted lift pivotable about a horizontal axis thereon between a lowered position for engaging the disabled vehicle and an upper position where it is locked for towing and means for locking the raised lift to the vertical isolator. Yokes are mounted on both the vertical isolator and on the lift and lockable to each other as well as to the vehicle and are steerable to insure smooth, positive following of the towing vehicle by the towed vehicle and thereby minimizing the possibility of swaying or ramming by the towed vehicle.

The vertical shock isolation together with the steering described above provides a very stable towing situation which can be accomplished at turnpike cruising speeds.

These and other objects, features and advantages of the invention will be apparent from the following detailed description of preferred embodiments of the invention with reference therein to the accompanying drawing.

BRIEF DESCRIPTION OF THE DRAWING

The FIGURE is an isometric view of towing and lifting apparatus in accordance with a preferred embodiment of the invention; and shows in partial phantom view the same apparatus modified for use as a portable crane.

DETAILED DESCRIPTION OF PREFERRED EMBODIMENTS

Referring now to the drawing the portable lifting and towing apparatus 10 comprises a platform 12 with a forward towing hitch 14 and a rear axle 16 mounting two rubber-tired wheels 18. A vertical shock isolator assembly 20 is mounted on the platform and comprises a floor beam 21, two spaced vertical loading members 22 mounted on two coil springs 23 and compressably engaging them via collars 24 or other detent means. Slidingly engagable guide extensions of the members 22 and the beam 21 are provided at 25 and 26, respectively, to prevent pivotal breakaway of the member/spring arrangement. The vertical loading members are interconnected by upper and lower horizontal beams 28. The vertical shock isolator assembly further comprises a post 29 mounted on the rear side of and secured to the horizontal beams 28 at midpoints [preferably centered] thereon.

A first yoke 30 is pivotably mounted on the hollow post 29 via a telescoping pipe 31 nested in post 29 and has spaced locking devices 35 thereon straddling the pivotally mounted central portion thereof. Preferably the locking devices 35 are mounted at the yoke ends.

A pivotal lift 40 is mounted on the platform and comprises a pair of adjustable length legs 42. One end of each of the legs 42 is mounted from the platform via a universal joint 43 and the other end of the legs are joined together at a universal joint 44.

A second yoke 50 is mounted on the universal joint and comprises a pivotal pin mounting 51, which is part of the universal joint mounting 44, and a pulley 52 mounted thereon. Automobile engaging belts 54 are mounted on the arms of the yoke 50 and locking devices 55 are mounted on the ends of yoke 50 and at opposite ends of straps 54.

The locking devices 35 and 55 comprise slotted metal channels with the slots being sized to engage the edge of a chain-link for locking. Adjacent links of a chain are arranged orthogonally to each other and if one links seats in the slot, the next adjacent link will be caught at the metal face containing the slots and the channel form of the locking device limits creep of a chain along the slots.

OPERATION

Yoke 50 is positioned against the bumper of the disabled car at the end thereof to be raised. The length adjustability and pivotability of each of legs 42 is used to so position yoke 50. A chain 90, with an end hook 91, is inserted through the locking device loop 55 at the outer end of the belt 54 at the left end of the yoke and a similar chain (not shown) is inserted through corresponding device 55 of belt 54 at the right end of the yoke. The hooks are passed under the vehicle undercarriage. The chains are locked in the slits of devices 55. Motor 60 is operated long enough to take up chain slack. Then the free ends of the chains are passed through the devices 55 at the ends of belts 54 nearest the yoke and locked. Then motor 60 is further operated to pivot yoke 50 to its upright position with yoke 50 essentially butting yoke 30 or to a lesser raised position if desired with yoke 50 at some distance from yoke 30. Pipe 31 can be raised or lowered and/or pivoted to adjust the height and altitude of yoke 30 to parallel raised yoke 50.

Then the chain free ends are passed over locks 35 and locked in the slits thereof. Motor 60 is then operated in reverse to slack off cable 61 and leave yokes 30 and 50 interconnected to each other and to the automobile solely via the locked chains. The portion of weight of the raised car distributed to its front end is carried by shock isolator assembly 20. The steerable and elevatable yoke 30 should be checked to be sure that its telescoping posts 29, 31 are locked and all chain lock points should be rechecked. The system is then ready for towing.

A reinforcing buttress beam 72 shores up vertical post 70. A motor driven come along winch 60 is mounted on beam 72 and drives lift 50 via a cable 61 reaved over winch pulleys 62 and 52 and finally secured at a cable end to a post 70 adjacent pulley 62. Accordingly energizing winch 60 in a take-up direction pulls yoke 50 via a pulley 52 to raise it to a vertical position.

There is also shown in the drawing, in phantom lines, accessory pieces which can be added to use the apparatus as a yard crane (with lift 40 and yoke 50 raised to vertical position and stowed against shock isolator assembly 20).

These pieces comprise boom 80, a telescoping extension and carrying a pulley 8 at one end and being pivotally secured to the top of post 70 at its opposite end; an adjustable length support beam 86 mountable between platform 12 and boom 80 with pivotal connections at both ends thereof; and a balancing leg 88 with a roller 89 thereon mountable from platform 12. If desired, a single pulley can be used in place of two separate pulleys 52 and 8. The pivotal connections are secured by pins 84. These added pieces are removed for restoring the apparatus to its auto towing function.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Improved towing and lifting apparatus comprising, in combination,
    means defining a towable wheeled platform,
    means defining a vertical shock isolator mounted on said platform and comprising at least one vertically arranged spring and a vertical loading member mounted on the spring and which, when vertically loaded, compresses the spring vertically,
    means defining a first steering yoke mounted on said vertical loading member via means defining a vertical pivotal axis,
    means defining a pivotally mounted lift pivotal about a horizontal axis, adjacent to the platform and adjacent to and orthogonal to said vertical shock isolator, between a first horizontally extending lift position and a second vertically extending lift position adjacent to and aligned essentially parallel with said vertical shock isolator,
    means defining a second steering yoke mounted on said lift via means defining a horizontal pivot axis when said lift is in said first position and a vertical pivot axis when said lift is in said second position,
    and means for locking a towable load to said lift and for locking said first and second yokes to each other.

2. Towing and lifting apparatus in accordance with claim 1 and further comprising
    power means mounted on said platform and drivingly interconnected to said lift to move the lift between said first and second positions thereof.

3. Towing and lifting apparatus in accordance with claim 1 and further comprising
    means defining a vertical buttress adjacent to and slidingly engaging said vertical isolator to buttress it against torque loads thereon.

4. Towing and lifting apparatus in accordance with claim 1 wherein
    said lift comprises:

a. a two-legged brace with each leg having an adjustable length, b. a pair of spaced universal joints on said platform connecting an end of each of said legs to said platform, c. a common universal joint rigidly joining the other ends of said legs and universally connecting them to said second yoke.

5. Towing and lifting apparatus in accordance with claim 1 wherein
said vertical isolator comprises a pair of spaced vertical loading members interconnected to each other by spaced upper and lower horizontal beams and coupled to said platform by a pair of coil springs and detents thereon and a vertical yoke support secured to said beams at points thereon between said vertical loading members.

6. Towing and lifting apparatus in accordance with claim 1 wherein
said locking means comprise chain-link-edgeway-locking, slotted, ends on said first and second yokes.

7. Towing and lifting apparatus in accordance with claim 1 and further comprising
power means mounted on said platform and drivingly interconnected to said lift to move the lift between said first and second positions thereof,
means defining a vertical buttress adjacent to and slidingly engaging said vertical isolator to buttress it against torque loads thereon,
and wherein
said lift comprises:

a. a two-legged brace with each leg having an adjustable length, b. a pair of spaced universal joints on said platform connecting an end of each of said legs to said platform, c. a common universal joint rigidly joining the other ends of said legs and universally connecting them to said second yoke, said vertical isolator comprises a pair of spaced vertical loading members interconnected to each other by spaced upper and lower horizontal beams and coupled to said platform by a pair of coil springs and detents thereon and a vertical yoke support secured to said beams at points thereon between said vertical loading members, said locking means comprise chain-link-edgeway-locking, slotted ends on said first and second yokes.

8. Towing and lifting apparatus in accordance with claim 7 and further comprising
means defining a platform mounted structure extending above the mounting height of said first yoke,
and means defining a cable drive comprising a first pulley mounted on said structure above the first yoke and a second pulley mounted on said second yoke.

9. Towing and lifting apparatus in accordance with claim 8 and further comprising,
means defining a boom pivotably mountable on said structure,
adjustable locking means for said boom,
and a pulley mounted on said boom,
to make the said apparatus utilizable as a cable drivable crane.

10. Apparatus in accordance with claim 1 and further comprising
means defining a platform mounted structure extending above the mounting height of said first yoke,
means defining a cable drive comprising a first pulley mounted on said structure above the first yoke and a second pulley mounted on said second yoke,
means defining a boom pivotably mountable on said structure,
adjustable locking means for said boom,
and a pulley mounted on said boom,
to make the said apparatus utilizable as a cable drivable crane.

* * * * *